(12) United States Patent
DeWald et al.

(10) Patent No.: US 10,273,961 B2
(45) Date of Patent: *Apr. 30, 2019

(54) FUEL CELL SYSTEM INCLUDING A FUEL CELL ASSEMBLY AND CENTRIFUGAL BLOWER SYSTEM

(71) Applicant: Watt Fuel Cell Corp., Port Washington, NY (US)

(72) Inventors: Paul DeWald, Glen Cove, NY (US); Caine Finnerty, Port Washington, NY (US); Robert P Donley, Golden, CO (US)

(73) Assignee: WATT AGENT, LLC, Philadelphia, PA (US)

( * ) Notice: Subject to any disclaimer, the term of this patent is extended or adjusted under 35 U.S.C. 154(b) by 673 days.

This patent is subject to a terminal disclaimer.

(21) Appl. No.: 14/666,993

(22) Filed: Mar. 24, 2015

(65) Prior Publication Data
US 2015/0194683 A1 Jul. 9, 2015

Related U.S. Application Data

(63) Continuation of application No. 13/168,280, filed on Jun. 24, 2011, now Pat. No. 9,017,893.

(51) Int. Cl.
*H01M 8/24* (2016.01)
*F04D 17/12* (2006.01)
(Continued)

(52) U.S. Cl.
CPC ............ *F04D 17/12* (2013.01); *F04D 17/16* (2013.01); *F04D 25/166* (2013.01);
(Continued)

(58) Field of Classification Search
CPC ............... H01M 8/04; H01M 8/04082; H01M 8/04089; H01M 8/04746; H01M 8/04783;
(Continued)

(56) References Cited

U.S. PATENT DOCUMENTS 3,387,769 A 6/1968 Davis
4,854,822 A 8/1989 Darroch
(Continued)

FOREIGN PATENT DOCUMENTS

CN 1796796 A 7/2006
DE 18022811 U 12/1959
(Continued)

*Primary Examiner* — Raymond Alejandro
(74) *Attorney, Agent, or Firm* — Dilworth & Barrese, LLP.; Michael J. Musella, Esq.

(57) ABSTRACT

A fuel cell system includes a fuel cell assembly that includes a plurality of individual fuel cells, each fuel cell having an electrolyte medium, a cathode and an anode; and at least one centrifugal blower system for providing a flow of gaseous medium to the fuel cell assembly. The centrifugal blower system includes a series of blower units, each blower unit in the series comprising a casing having an axial inlet and a radial outlet, an impeller disposed within the casing for drawing a gaseous medium at a first pressure in the axial inlet and expelling gaseous medium at a second higher pressure through the radial outlet, and a motor for driving the impeller; and a duct connecting the radial outlet of at least one blower unit in the series of blower units with the axial inlet of at least one successive blower unit in the series of blower units.

16 Claims, 11 Drawing Sheets

(51) Int. Cl.

| | | |
|---|---|---|
| *H01M 8/04082* | (2016.01) | |
| *H01M 8/04746* | (2016.01) | |
| *H01M 8/04089* | (2016.01) | |
| *F04D 25/16* | (2006.01) | |
| *F04D 29/28* | (2006.01) | |
| *H01M 8/04* | (2016.01) | |
| *H01M 8/00* | (2016.01) | |
| *H01M 8/12* | (2016.01) | |
| *F04D 17/16* | (2006.01) | |
| *H01M 8/124* | (2016.01) | |

(52) U.S. Cl.
CPC .......... *F04D 29/281* (2013.01); *H01M 8/004* (2013.01); *H01M 8/04* (2013.01); *H01M 8/04082* (2013.01); *H01M 8/04089* (2013.01); *H01M 8/04746* (2013.01); *H01M 8/04776* (2013.01); *H01M 8/12* (2013.01); *H01M 2008/1293* (2013.01); *H01M 2300/0071* (2013.01); *Y02E 60/525* (2013.01)

(58) Field of Classification Search
CPC .......... H01M 8/12; H01M 8/004; H01M 8/24; F04D 25/16; F04D 25/166
See application file for complete search history.

(56) References Cited

U.S. PATENT DOCUMENTS

| | | | |
|---|---|---|---|
| 4,917,572 A | 4/1990 | Van Houten | |
| 5,839,879 A | 11/1998 | Kameoka et al. | |
| 6,497,971 B1 | 12/2002 | Reiser | |
| 6,525,935 B2 | 2/2003 | Casebolt | |
| 6,877,954 B2 | 4/2005 | Lin et al. | |
| 7,061,758 B2 | 6/2006 | Liu et al. | |
| 7,184,265 B2 | 2/2007 | Kim et al. | |
| 7,314,679 B2 | 1/2008 | Hatsugai et al. | |
| 7,351,031 B2 | 4/2008 | Horng et al. | |
| 7,744,341 B2 | 6/2010 | Hwang et al. | |
| 7,802,617 B2 | 9/2010 | Hwang et al. | |
| 7,864,525 B2 | 1/2011 | Chen et al. | |
| 7,885,068 B2 | 2/2011 | Seo et al. | |
| 7,887,290 B2 | 2/2011 | Chen et al. | |
| 7,891,942 B2 | 2/2011 | Hsu | |
| 7,943,260 B2 | 5/2011 | Brighton et al. | |
| 7,948,750 B2 | 5/2011 | Hung et al. | |
| 9,017,893 B2 * | 4/2015 | DeWald | F04D 25/166 429/455 |
| 2005/0014047 A1 | 1/2005 | Hatsugai et al. | |
| 2006/0051203 A1 | 3/2006 | Lee et al. | |
| 2007/0228638 A1 | 10/2007 | Ikeda | |

FOREIGN PATENT DOCUMENTS

| | | |
|---|---|---|
| DE | 3025598 A1 | 2/1982 |
| DE | 29504886 U1 | 7/1995 |
| EP | 1318307 A1 | 6/2003 |
| EP | 1571341 A1 | 9/2005 |
| EP | 1840057 A2 | 10/2007 |
| GB | 920188 A | 3/1963 |
| RU | 2196254 C2 | 1/2003 |
| RU | 2380575 C2 | 1/2010 |
| WO | 9831937 A1 | 7/1998 |
| WO | 9855769 A1 | 12/1998 |

\* cited by examiner

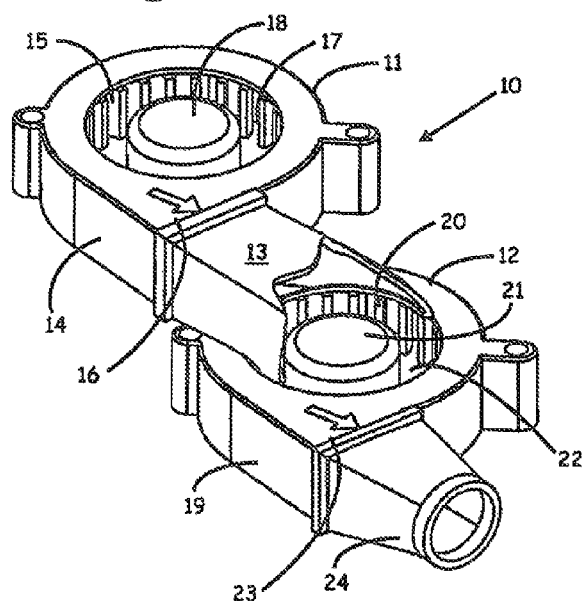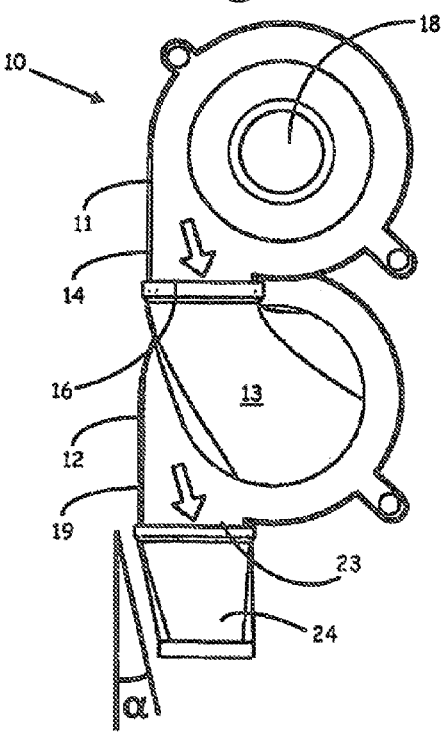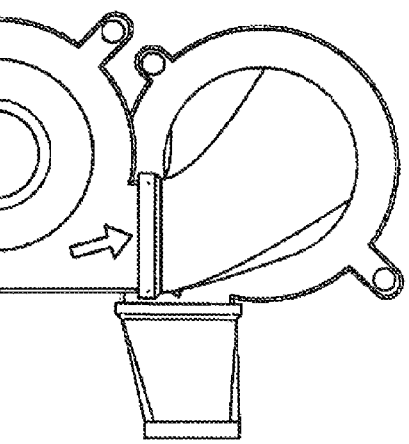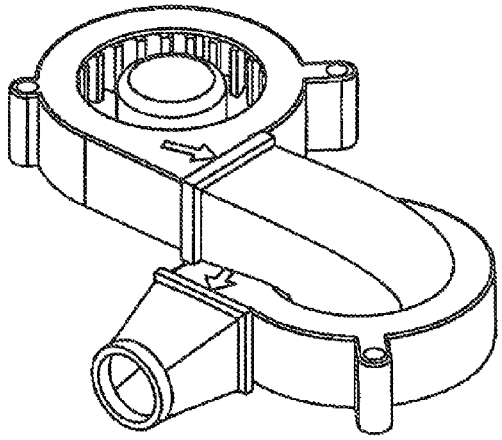

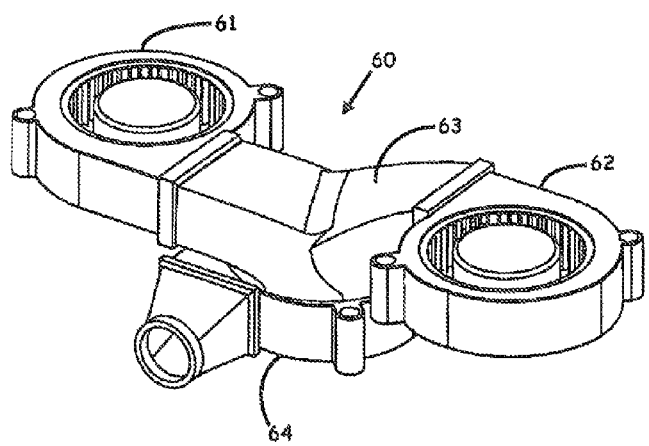
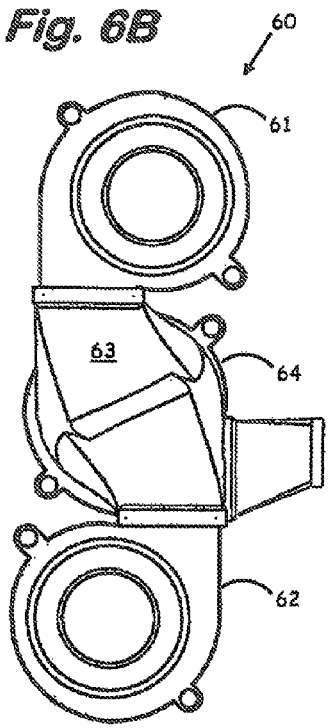
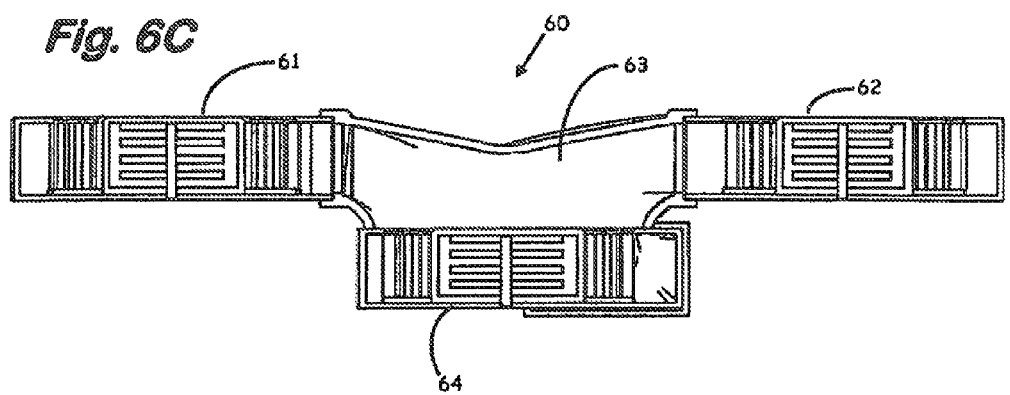

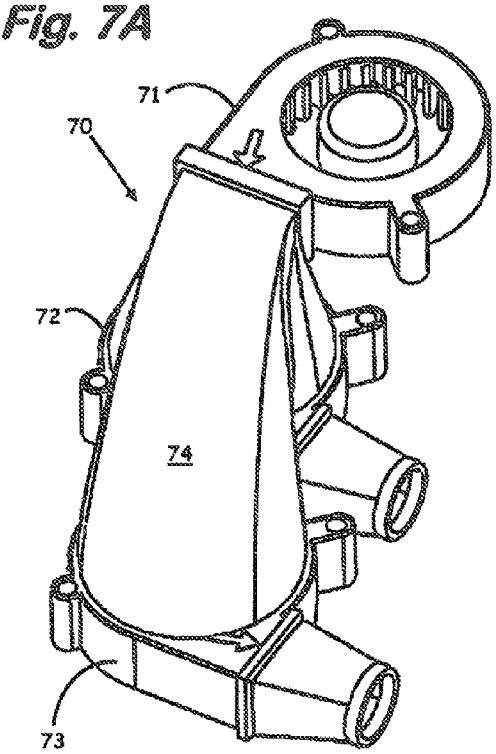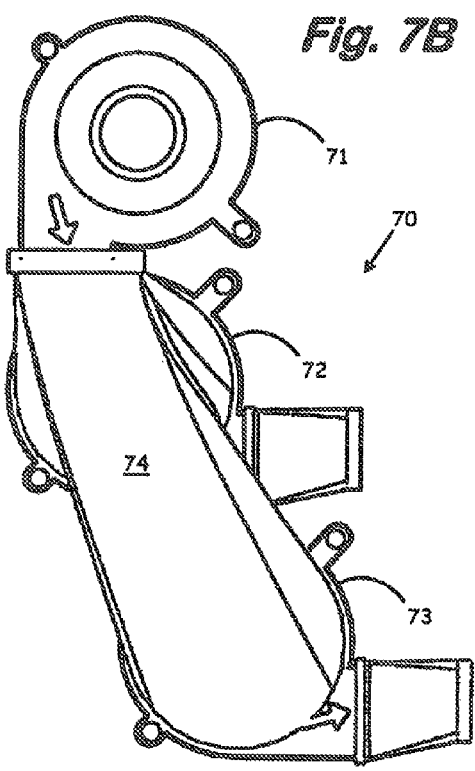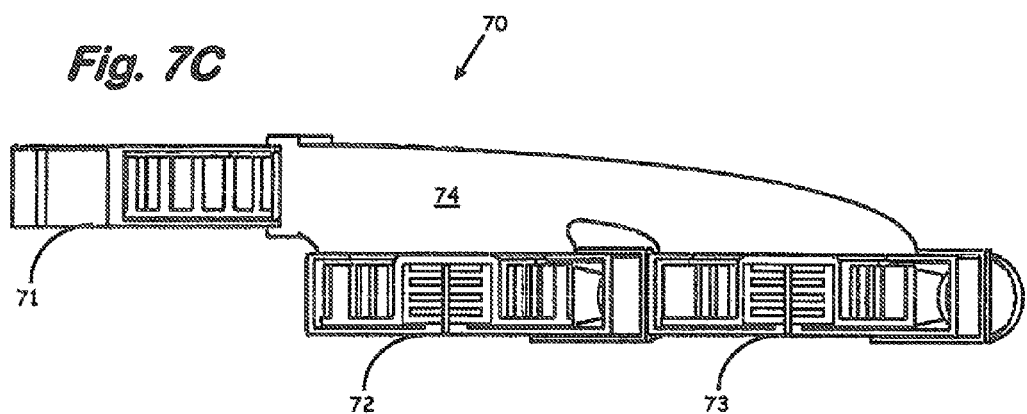

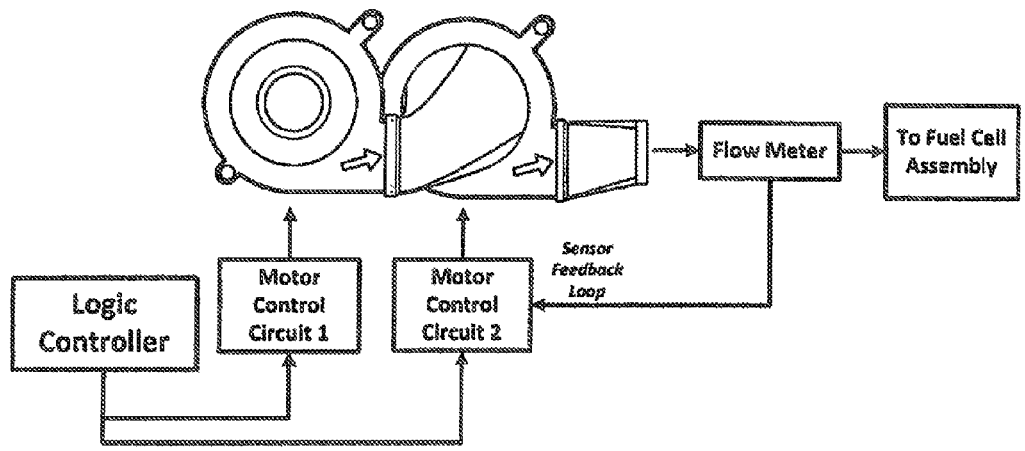
Fig. 11A  Blower Control
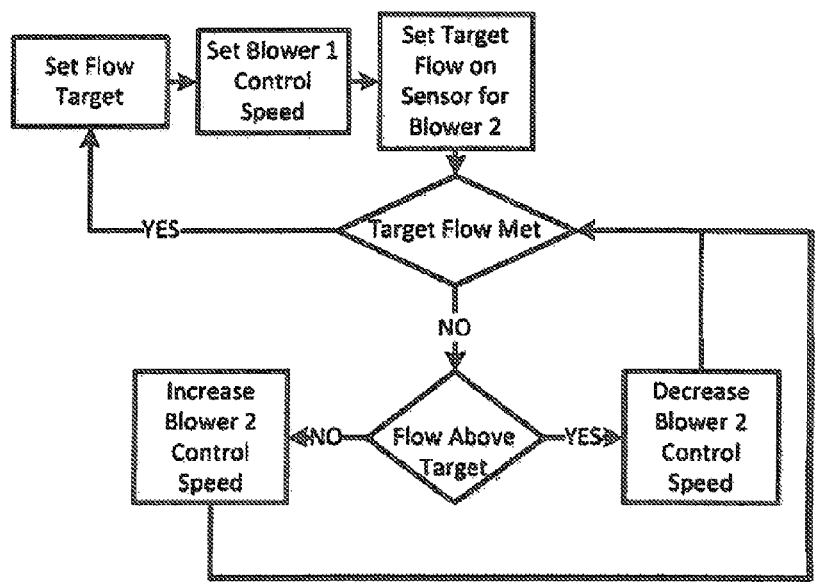
Fig. 11B  Control Logic Diagram

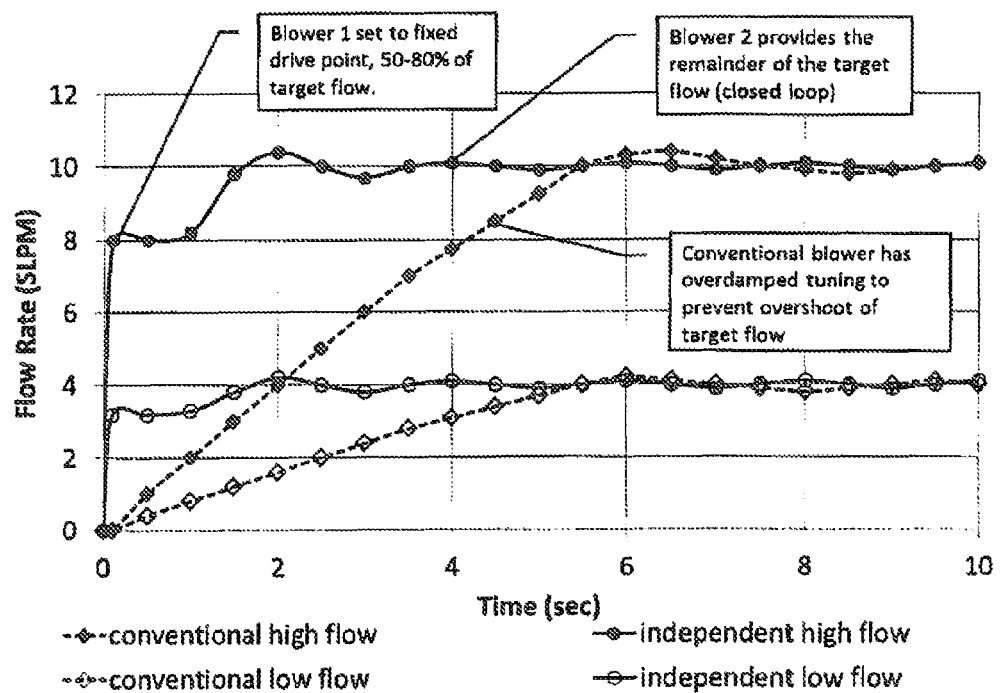

FUEL CELL SYSTEM INCLUDING A FUEL CELL ASSEMBLY AND CENTRIFUGAL BLOWER SYSTEM

REFERENCE TO PRIOR APPLICATIONS

This application is a continuation application of application Ser. No. 13/168,280, filed Jun. 24, 2011, now U.S. Pat. No. 9,017,893, issued Apr. 28, 2015, the entire contents of which are incorporated herein by reference.

BACKGROUND OF THE INVENTION

This invention relates to centrifugal blowers and to fuel cells incorporating same.

Centrifugal blowers, or centrifugal fans, are a well known type of device for providing a flow or movement of a gaseous medium. A common type of centrifugal blower includes a housing having an axially directed gas inlet and a radially directed gas outlet, an impeller disposed within the housing for drawing gas at a first pressure into the inlet and expelling gas at a second higher pressure through the outlet and a motor for driving, i.e., spinning, the impeller. Variations of this general type of centrifugal blower are disclosed in, e.g., U.S. Pat. Nos. 4,917,572; 5,839,879; 6,877,954; 7,061,758; 7,351,031; 7,887,290; 7,891,942, and, U.S. 2006/0051203, the entire contents of which are incorporated by reference herein.

Centrifugal blowers in single unit and multiple independent unit configurations have been disclosed as components of cooling systems for computers, servers and other heat-generating electrical and electronic devices and equipment. See, e.g., U.S. Pat. Nos. 6,525,935; 7,184,265; 7,744,341; 7,802,617; 7,864,525; 7,885,068; 7,948,750; 7,902,617; and, 7,885,068, the entire contents of which are incorporated by reference herein.

Centrifugal blowers of the general type referred to above have been disclosed as components of fuel cells, of both the polyelectrolyte membrane (PEM) and solid oxide fuel cell (SOFC) types, where they function in one or more capacities, e.g., providing a flow of an oxidizer-containing gas such as air to the cathode elements of the fuel cell assembly and/or a flow of gaseous or vaporized fuel to its anode elements, recycling unspent fuel to the anode elements of the fuel cell assembly, providing a stream of cool air for cooling the fuel cell assembly or providing a stream of hot gas for vaporizing a liquid fuel prior to the external or internal reforming of the fuel to provide hydrogen for the operation of the fuel cell assembly. Fuel cell-blower assemblies featuring one or more centrifugal blowers are described in, e.g., U.S. Pat. Nos. 6,497,971; 6,830,842; 7,314,679 and 7,943,260, the entire contents of which are incorporated by reference herein.

SUMMARY OF THE INVENTION

In accordance with the present invention, there is provided a centrifugal blower system comprising:

a) a series of blower units, each blower unit in the series comprising a casing having an axial inlet and a radial outlet, an impeller disposed within the casing for drawing a gaseous medium at a first pressure into the inlet and expelling gaseous medium at a second higher pressure through the outlet and a motor for driving the impeller, and, b) a duct connecting the outlet of at least one blower unit in the series with the inlet of at least one other blower unit in the series.

Further in accordance with the present invention there is provided a fuel cell comprising:

a) a fuel cell assembly comprising a plurality of individual fuel cells each fuel cell having an electrolyte medium, a cathode and an anode; and, b) at least one centrifugal blower system, described supra, for providing a flow of gaseous medium to the fuel cell assembly.

The multiple centrifugal blower system herein offers several advantages over a single centrifugal blower, particularly when incorporated in a fuel cell for managing the flow of gaseous media therein.

Single centrifugal blowers require suitable control of the full range of motor rpm in order to meet fluctuating gas flow demands. Depending on the pressure and flow requirements for a particular blower application, optimum performance of the blower may be achieved by employing an impeller of relatively small size driven at relatively high rpm, e.g., 20,000 rpm and above, or an impeller of relatively large size driven at relatively low rpm, e.g., below 20,000 and more commonly, below 10,000. The first arrangement, i.e., the use of a relatively small impeller driven at relatively high rpm, requires a more powerful and specialized motor which of necessity will draw a correspondingly greater amount of power for its operation. The second arrangement, i.e., use of a relatively large impeller driven at relatively low rpm, makes control and fine tuning of the blower output more difficult due to the greater inertia of a large impeller.

In order to prevent overshoot of the target pressure and gas flow, a blower employing a relatively high inertia impeller must be overdamped when tuning the blower for its expected range of gas pressure and flow capability. The effect of this overdamping to compensate for the relatively high inertia of the impeller is to cause the blower to be slow in responding to changing, and often rapidly changing, gas flow requirements. This characteristically slow response of a single centrifugal blower possessing a relatively high inertia impeller requires a more complicated control system for quickly responding to fluctuations in gas flow demand.

Utilizing the multiple blower system of this invention for meeting the gas flow requirements of a fuel cell enables the system to benefit from both low inertia impellers for control as well as low drive motor rpm and power draw to provide required gas flow and pressure. Controlling one or more blower units in the system to provide a major portion of the target gas pressure and gas flow, e.g., 60-90% of the target gas pressure and gas flow, enables the remainder of the target gas pressure and gas flow to be provided by one or more other blower units in the system. The result of splitting the task of providing target gas flows and pressures between at least two integrated, i.e., interconnected, centrifugal blowers in accordance with the invention results in such flows and pressures being reached in less time and with greater accuracy than is possible with a single centrifugal blower unit. Additionally, the power draw and noise level are low in the blower system of the invention since the blower impellers do not require high rpm for their operation.

Thus, in its integrated, or interconnected, arrangement of multiple centrifugal blowers inherently possessing smaller inertial forces than a single centrifugal blower of comparable gas flow capability, the centrifugal blower system herein provides improved response times and control over a broad range of gas pressure and gas flow requirements than that of a single centrifugal blower unit.

These and other novel features and advantages of this invention will become more apparent from the following detailed description and accompanying drawings.

BRIEF DESCRIPTION OF THE DRAWINGS

FIG. 1A illustrate, respectively, a perspective view of a dual blower system of the invention in the 0° gas flow configuration with a section of the duct cutaway to show a portion of the inlet and impeller of the second blower unit;

FIG. 1B illustrates a plan view of the dual blower system of 1A;

FIGS. 2A and 2B illustrate, respectively, a perspective view and plan view of a dual blower system of the invention in the 90° gas flow configuration;

FIGS. 6A, 6B and 6C illustrate, respectively, perspective, plan and side elevation views of a triple blower system of the invention in which the combined outlet streams of first and/or second blower units are introduced into the inlet of a third blower unit;

FIGS. 7A, 7B and 7C illustrate, respectively, perspective, plan and side elevation views of a triple blower system of the invention in which the outlet stream of a first blower unit is introduced into the inlet of a second and/or third blower unit;

FIG. 11A is a diagrammatic illustration of a blower control system for a dual blower system in accordance with the invention;

FIG. 11B is a logic flow diagram for the dual blower control system of FIG. 10A;

FIG. 12 is a graphic comparison of the typical performance, respectively, of a dual blower system in accordance with the invention and a single blower system of comparable gas flow capability;

DETAILED DESCRIPTION OF THE INVENTION

Figure 3A:
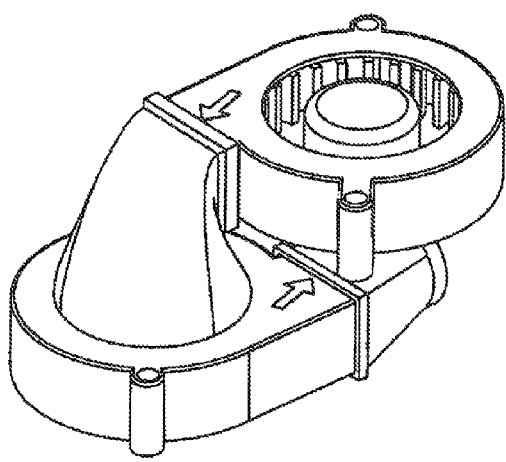
FIGS. 3A and 3B illustrate, respectively, a perspective view and plan view of a dual blower system of the invention in the 180° gas flow configuration.
Figure 3B:
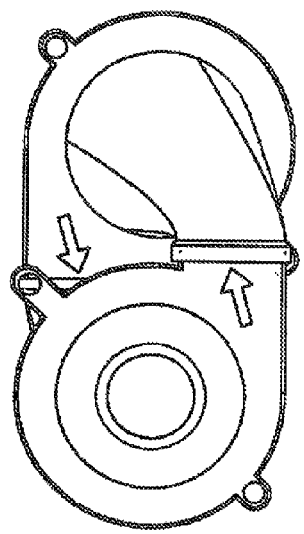
Figure 4A:
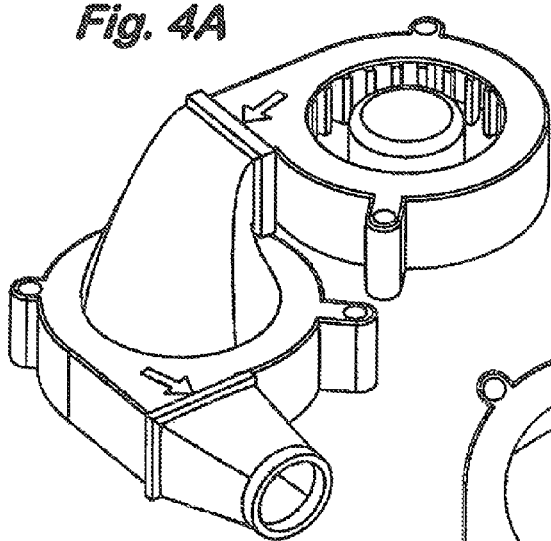
FIGS. 4A and 4B illustrate, respectively, a perspective view and plan view of a dual blower system of the invention in the 270° gas flow configuration.
Figure 4B:
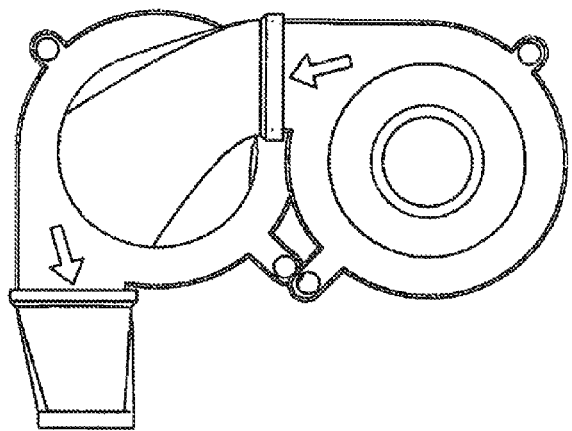

Referring to FIGS. 1A and B, in one embodiment of the centrifugal blower system of the invention, dual centrifugal blower system 10 includes a first centrifugal blower unit 11 connected to a second centrifugal blower unit 12 through duct 13. First blower unit 11 includes a casing 14 having an axial inlet 15 and a radial outlet 16, an impeller 17 disposed within casing 14 for drawing a gaseous medium at a first pressure into axial inlet 15 and expelling gaseous medium at a second higher pressure through radial outlet 16 and an electric motor 18 for driving impeller 17. Second blower unit 12 includes a casing 19 and, as shown by the cutaway section of duct 13 in FIG. 1A, an impeller 20 disposed within casing 19 and driven by electrical motor 21 and an axial inlet 22 for receiving gas medium discharged from outlet 16 of first blower unit 11. Second blower unit further includes a radial outlet 23 and outlet gas stream housing 24.

The arrows in FIGS. 1A and 1B and in the other embodiments of the invention illustrated in other figures herein indicate the general direction of the gas stream through the radial outlet of each blower unit in the series of blowers constituting the blower system. As shown, e.g., in FIG. 1B, the trajectory of the gas stream expelled through outlet 16 of first blower unit 11 and the trajectory of the gas stream expelled through outlet 23 of second blower unit 12 are not parallel to their respective outlets but are at some angle thereto. By arranging the geometry of duct 13 to receive the gas stream discharged through outlet 16 in such a manner that the stream remains approximately parallel to the interior walls of the duct, it is possible to prevent or reduce the turbulence that would otherwise occur were the stream to impinge upon these walls. Turbulence is advantageously minimized or avoided so as to reduce or eliminate it as a source of back pressure in the blower system. For this same reason, it is advantageous to arrange the angle of gas stream housing 24 so that its interior walls will be approximately parallel to the trajectory of the gas stream discharged through outlet 23 of second blower unit 12. The optimum geometry of the interior walls of duct 13 relative to the trajectory of its gas stream and the angle of offset of gas stream housing 24 can be readily determined for a given gas blower system employing routine experimentation. In the gas blower system shown in FIGS. 1A and 1B, interior, or guiding, surfaces of duct 13 and interior, or guiding, surfaces of gas stream housing 24 can be pitched at an angle $\alpha$ of from 12° to 20°, and preferably from 14° to 18°, relative to outlets 16 and 21.

The embodiments of the dual blower systems of FIGS. 2A, 2B, 3A, 3B, 4A and 4B, are similar in structure to the dual blower system illustrated in FIGS. 1A and 1B except for the orientation of the outlet of second blower unit 12 relative to the outlet of first blower unit 11. In the blower system of FIGS. 1A and 1B, the angle of orientation is about 0°. In the blower system of FIGS. 2A and 2B, this angle is about 90°, in the blower system of FIGS. 3A and 3B the angle is about 180° and in the blower system of FIGS. 4A and 4B the angle is about 270°. All orientation angles are, of course, contemplated with the optimum angle of orientation for a given centrifugal blower system being made to depend upon the specific use to which the blower system is to be put.

Another angle of significance in the centrifugal blower system of the invention is the angle of pitch of the outlet of the first blower relative to the inlet of the second blower. In the embodiments of blower systems illustrated in FIGS. 5A-5D, the approximate angle is 0° in FIG. 5A, 30° in FIG. 5B, 60° in FIG. 5C and 90° in FIG. 5D. As in the case of the blower unit orientation angles referred to above, these blower pitch angles can assume values throughout the entire range of 0°-180°, again, with the optimum pitch value of a given blower system depending on specific application requirements.

Thus far, dual centrifugal blower systems have been disclosed with the output of the first blower being introduced into the inlet of the second blower and with each of the blowers having about the same range of gas pressure and gas flow output capability. The basic configuration of dual blower systems can be represented as "1 into 2" meaning that gas discharged from the first blower is introduced into the inlet of the second blower. However, as those skilled in the art will readily recognize, numerous other arrangements are within the scope of this invention.

Other embodiments of the centrifugal blower system herein include those with three, four and even a greater number of blower units, those in which the discharge from two or more blowers is introduced into the inlet of a single blower and those in which the discharge of a single blower is introduced into the inlets of two or more blowers. Blower systems of the foregoing kind can be designated, e.g., "1 into 2 into 3", etc., where the gas discharge stream of a preceding blower unit is ducted into the inlet of the following blower unit in the series, "1 and 2 into 3", etc., where the discharged streams of first and second blower units are commonly ducted into the inlet of a third blower unit and "1 into 2 and 3" where the discharge stream of a first blower unit is ducted into second and third blower units. In blower systems in which a gas stream of one blower is combined with the gas stream of another blower or a single blower stream is divided into two separate streams, valving may be provided to regulate the various gas flows in these systems.

In the centrifugal blower system 60 illustrated in FIGS. 6A, 6B and 6C, the gas discharged from each of blower units 61 and 62 is introduced via duct 63 into the inlet of blower unit 64. Centrifugal blower system 60 is therefore an example of the "1 and 2 into 3" configuration referred to above. This configuration enables control to be achieved whereby the gas flow capability of a single relatively large blower is obtained with the quick response characteristics of several smaller blowers.

FIGS. 7, 7B and 7C show centrifugal blower system 70 with the output of single blower unit 70 being introduced into blower units 72 and 73 via common duct 74, an example of a "1 into 2 and 3" arrangement of blower units. This configuration of blower units enables use of a single primary gas pressure and gas flow supply blower with individual blowers downstream to provide more accurate control of two separate gas discharge streams.

Figure 8:
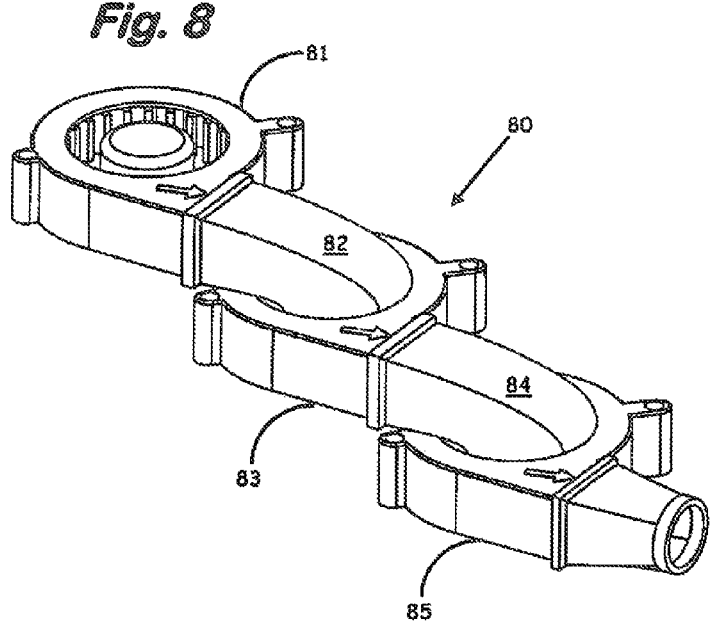
FIG. 8 is a perspective view of a triple blower system in accordance with the invention in which the outlet stream of a first blower unit is introduced into the inlet of a second blower unit and the outlet stream of the second blower unit is introduced into the inlet of a third blower unit.

In the embodiment shown in FIG. 8, the discharge stream from first blower unit 81 of triple blower system 80 is introduced via duct 82 into second blower unit 83 with the discharge stream of blower unit 82 being introduced via duct 84 into third blower 85, such illustrating the "1 into 2 into 3" configuration referred to above. This successive arrangement of three blowers permits blowers 83 and 85 to quickly and accurately respond to target gas pressure and gas flow requirements the greater part of which are provided by blower unit 81.

Figure 9:
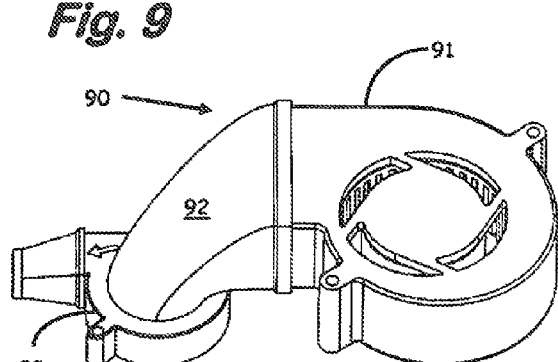
FIG. 9 is a perspective view of a dual blower system in accordance with the invention in which the first blower unit possesses a larger impeller than that of the second blower unit.

Further included within the scope of this invention are those centrifugal blower systems in which one or more blower units differ from one or more others in the system in their range of gas pressure and gas flow output capability. Such an embodiment of gas blower system is illustrated in FIG. 9. Dual centrifugal gas blower system 90 possesses a first blower unit 91 of relatively large gas pressure and gas flow capability with the gas stream expelled therefrom being introduced via duct 92 into smaller blower unit 93. This arrangement of blowers of differing size enables fine adjustment of higher gas flow rates. Where gas flow requirements exceed that which can be achieved with a blower system in which the blower units are of approximately the same capability, the larger capacity blower unit can be supplemented by the lower capacity unit. This permits a greater range of gas flow while still realizing the quicker and more accurate flow control characteristics of the centrifugal blower system of this invention.

Figure 10:
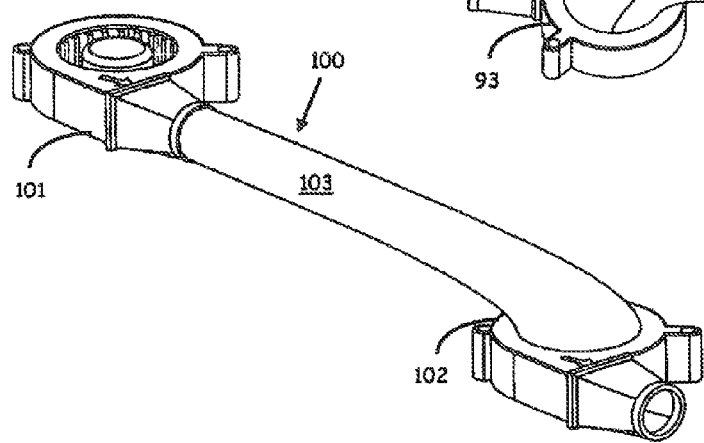
FIG. 10 is a perspective view of a dual blower system in accordance with the invention in which the blower units are separated from each other.

In all of the centrifugal blower systems of the invention, the individual blower units, their interconnecting duct(s) aside, need not be in direct contact with each other but can be separated by a distance. Placing one or more blowers in the blower system of the invention at a separate location can be of advantage when optimal packaging considerations for a particular application favor such an arrangement. An embodiment of a blower of this type is shown in FIG. 10 where, in dual centrifugal blower system 100, first blower 101 is separated from second blower 102 by nearly the length of tubular duct 103.

The dimensions, voltage, power draw, impeller speed, air flow, noise level as well as other characteristics of a particular blower unit utilized in the centrifugal blower system of the invention can vary widely depending on gas pressure and gas flow requirements and end-use application. The following table lists some typical characteristics for a range of useful blower units:

| Size (mm) | Rating Voltage (VDC) | Power Current (AMP) | Power Consumption (WATTS) | Speed (RPM) | Air Flow (CFM) | Static Pressure (Inch-Water) | Noise (dBA) | Weight (g) |
|---|---|---|---|---|---|---|---|---|
| 35 × 35 × 7 | 12 | 0.065 | 0.8 | 6300 | 0.9 | 0.27 | 22.2 | 8 |
| 45 × 45 × 20 | 12 | 0.04 | 0.48 | 3500 | 4.6 | 0.22 | 21 | 22.64 |
| 50 × 50 × 15 | 12 | 0.17 | 2.2 | 6000 | 4.7 | 0.97 | 42.2 | 30 |
| 50 × 50 × 15 | 12 | 0.1 | 1.2 | 5000 | 4.0 | 0.67 | 39.8 | 30 |
| 50 × 50 × 15 | 12 | 0.06 | 0.7 | 4000 | 3.0 | 0.40 | 33.4 | 30 |
| 50 × 50 × 15 | 12 | 0.044 | 0.5 | 3000 | 2.3 | 0.16 | 27 | 30 |
| 50 × 50 × 20 | 12 | 0.124 | 1.5 | 5200 | 5.7 | 0.66 | 35 | 33 |
| 50 × 50 × 20 | 12 | 0.104 | 1.3 | 4800 | 5.2 | 0.56 | 33 | 33 |
| 50 × 50 × 20 | 12 | 0.088 | 1.1 | 4400 | 4.8 | 0.46 | 30 | 33 |
| 60 × 60 × 15 | 12 | 0.105 | 1.3 | 4800 | 5.2 | 0.44 | 40.5 | 45 |

-continued

| Size (mm) | Rating Voltage (VDC) | Power Current (AMP) | Power Consumption (WATTS) | Speed (RPM) | Air Flow (CFM) | Static Pressure (Inch-Water) | Noise (dBA) | Weight (g) |
|---|---|---|---|---|---|---|---|---|
| 60 × 60 × 15 | 12 | 0.07 | 0.8 | 4200 | 4.7 | 0.32 | 36 | 45 |
| 60 × 60 × 15 | 12 | 0.04 | 0.5 | 3200 | 3.5 | 0.18 | 29 | 45 |
| 60 × 60 × 25 | 12 | 0.14 | 1.7 | 3600 | 7.3 | 0.58 | 32.4 | 55 |
| 75 × 75 × 30 | 12 | 0.3 | 3.6 | 3400 | 13.6 | 0.6 | 43.5 | 86.5 |
| 75 × 75 × 30 | 12 | 0.23 | 2.8 | 3000 | 12.3 | 0.48 | 40.5 | 86.5 |
| 75 × 75 × 30 | 12 | 0.13 | 1.5 | 2400 | 9.6 | 0.27 | 33.9 | 86.5 |
| 75 × 75 × 30 | 12 | 0.08 | 1.0 | 1900 | 7.5 | 0.15 | 28 | 86.5 |
| 75 × 75 × 30 | 24 | 0.17 | 4.1 | 3400 | 13.6 | 0.6 | 43.5 | 86.5 |
| 75 × 75 × 30 | 24 | 0.14 | 3.4 | 3000 | 12.3 | 0.48 | 40.5 | 86.5 |
| 75 × 75 × 30 | 24 | 0.08 | 1.9 | 2400 | 9.6 | 0.27 | 33.9 | 86.5 |
| 75 × 75 × 30 | 24 | 0.05 | 1.2 | 1900 | 7.5 | 0.15 | 28 | 86.5 |
| 97 × 97 × 33 | 12 | 560 | 6.7 | 3600 | 26.7 | 0.76 | 54.3 | 183 |
| 97 × 97 × 33 | 12 | 0.72 | 9.6 | 3600 | 30.5 | 0.92 | 55.8 | 185 |
| 97 × 97 × 33 | 12 | 0.56 | 6.7 | 3200 | 26.6 | 0.65 | 53.1 | 185 |
| 97 × 97 × 33 | 12 | 0.30 | 3.6 | 2700 | 22.4 | 0.43 | 50 | 185 |
| 97 × 97 × 33 | 24 | 0.39 | 9.4 | 3600 | 30.5 | 0.92 | 55.8 | 185 |
| 97 × 97 × 33 | 24 | 0.25 | 6.0 | 3200 | 26.6 | 0.65 | 53.1 | 185 |
| 97 × 97 × 33 | 24 | 0.16 | 3.8 | 2700 | 22.4 | 0.43 | 50 | 185 |
| 97 × 97 × 33 | 48 | 0.17 | 8.2 | 3600 | 30.5 | 0.92 | 55.8 | 185 |
| 97 × 97 × 33 | 48 | 0.13 | 6.2 | 3200 | 26.6 | 0.65 | 53.1 | 185 |
| 97 × 97 × 33 | 48 | 0.09 | 4.3 | 2700 | 22.4 | 0.43 | 50 | 185 |
| 120 × 120 × 32 | 12 | 755 | 9.06 | 2800 | 38.7 | 1.14 | 55.8 | 242 |
| 120 × 120 × 32 | 12 | 0.82 | 9.8 | 2500 | 35.9 | 0.89 | 53.8 | 250 |
| 120 × 120 × 32 | 12 | 0.45 | 5.4 | 2100 | 31.4 | 0.64 | 49.6 | 250 |
| 120 × 120 × 32 | 24 | 0.38 | 9.1 | 2500 | 35.9 | 0.89 | 53.8 | 250 |
| 120 × 120 × 32 | 24 | 0.24 | 5.8 | 2100 | 31.4 | 0.64 | 49.6 | 250 |
| 120 × 120 × 32 | 24 | 0.38 | 9.1 | 2500 | 35.9 | 0.89 | 53.8 | 250 |
| 120 × 120 × 32 | 24 | 0.24 | 5.8 | 2100 | 31.4 | 0.64 | 49.6 | 250 |
| 120 × 120 × 32 | 48 | 0.12 | 5.8 | 2100 | 31.4 | 0.64 | 49.6 | 250 |

It will, of course, be recognized that the invention is not limited to blower units possessing the forgoing characteristics but can utilize any centrifugal blower unit having lesser or greater dimensions, voltage and power requirements, impeller rpm, gas pressure and gas flow capabilities, etc., than those listed in the table.

FIGS. 11A and 11B illustrate, respectively, a blower control system of a centrifugal blower system of the invention and a diagrammatic representation of its control logic. As those skilled in the art will recognize, these blower control operations can be carried out by a suitably programmed microprocessor.

FIG. 12 compares the typical flow rate performance of independently controlled first and second blowers in a dual centrifugal blower system such as that shown in FIGS. 1A and 1B with a conventional larger single centrifugal blower of approximately equivalent gas flow capability. As the data plots show, the overdamping of the single blower which is required to avoid or suppress overshooting target gas flows resulted in a longer period of time to reach both low target flow and high target flow in contrast to the considerably faster times for achieving these target flow levels employing the multiple interconnected centrifugal blower system of the invention.

Figure 5A:
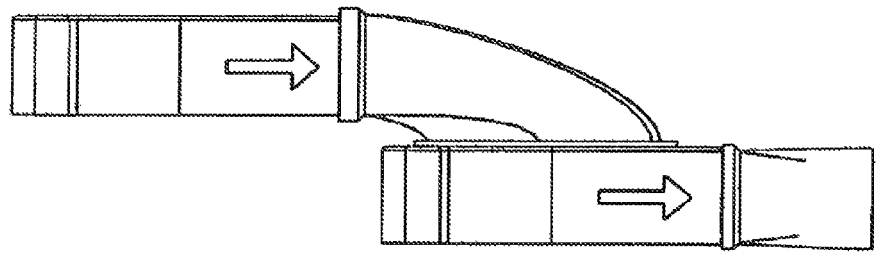
FIGS. 5A, 5B, 5C and 5D are external side views of dual blower systems of the invention with pitch angles of the outlet of the first blower unit relative to the inlet of the second blower unit of, respectively, 0°, 30°, 60° and 90°.
Figure 5B:
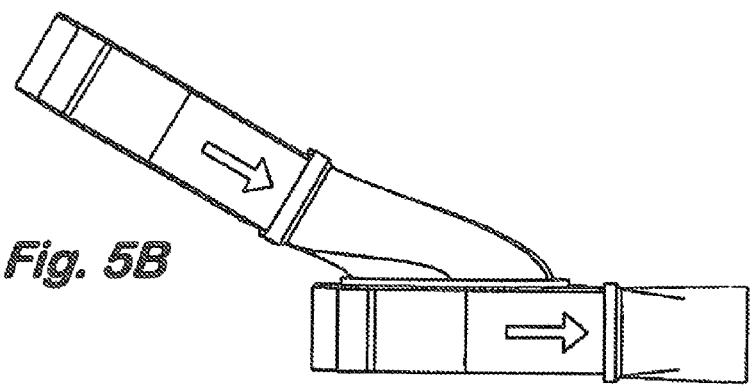
Figure 5C:
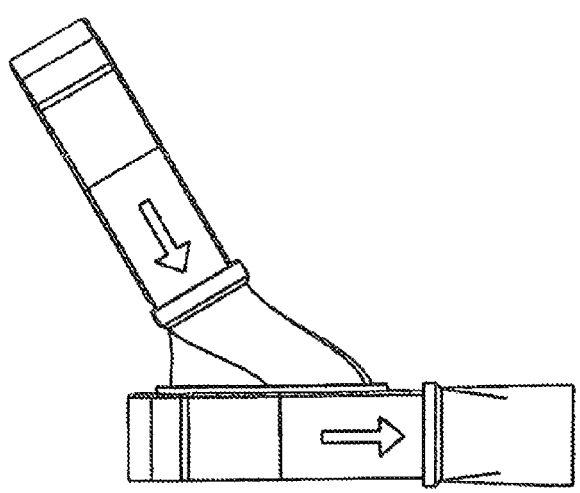
Figure 5D:
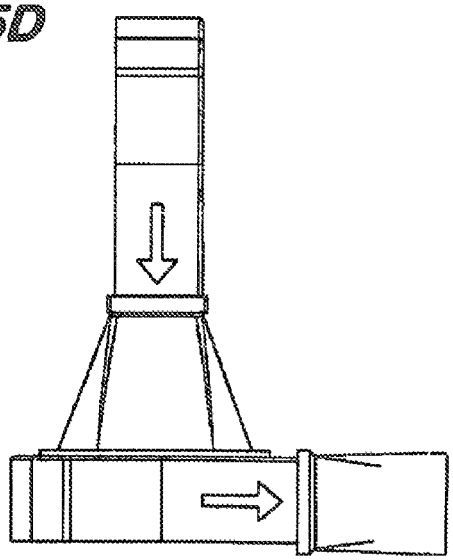
Figure 13A:
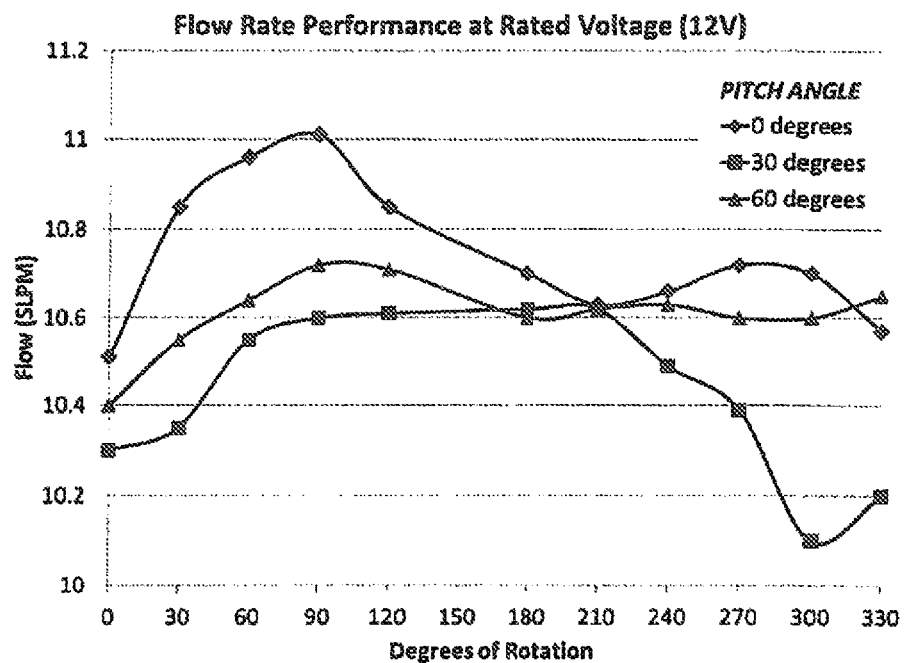
FIGS. 13A and 13B are graphic presentations of flow rate and pressure data for dual blower systems of the invention having pitch angles, respectively, of 0°, 30° and 60°.
Figure 13B:
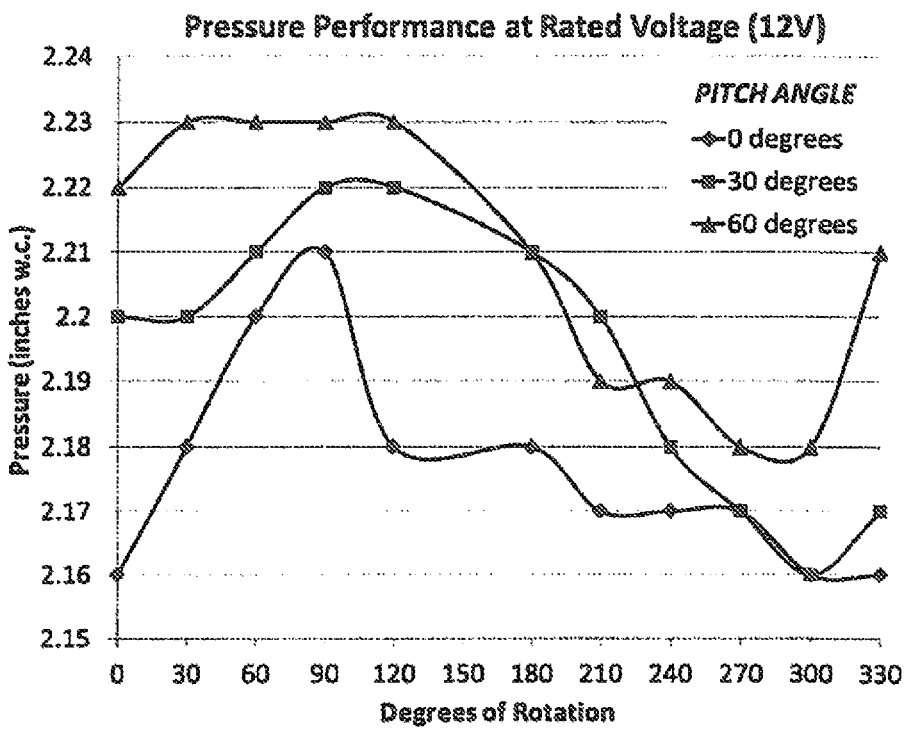

FIGS. 13A and 13B are graphical presentations of, respectively, gas flow rate and gas pressure performance characteristics for dual blower system configurations of the invention in which the pitch angles of the blower units are 0°, 30° and 60° (as shown in FIGS. 5A, 5B and 5C).

The centrifugal blower system of this invention can manage gas flow requirements for a variety of applications. FIGS. 14A, 14B, 15A and 15B illustrate the use of the blower system of the invention to provide and mediate gas flows in an SOFC assembly of the tubular type (FIGS. 14A and 14B) and planar type (FIGS. 15A and 15B).

Figure 14A:
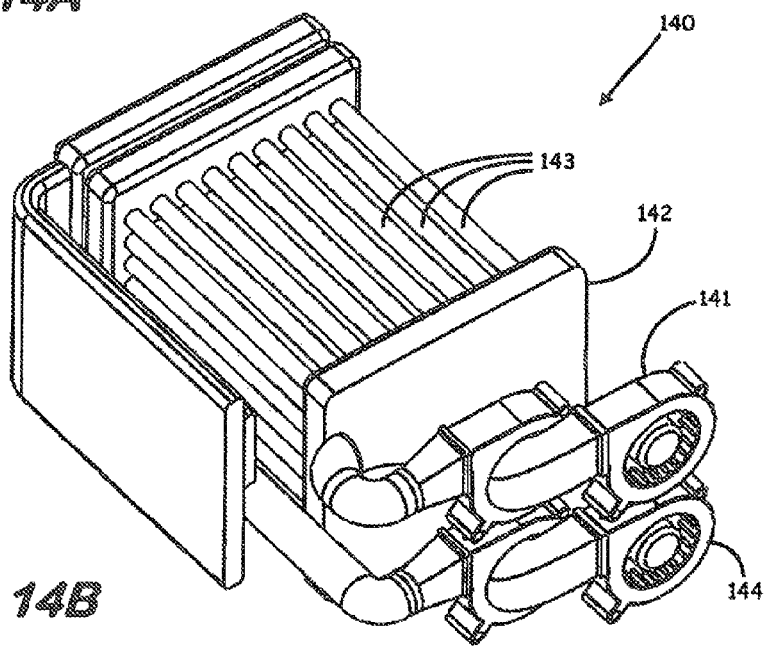
FIGS. 14A and 14B illustrate, respectively, perspective and plan views of a tubular SOFC assembly possessing separate dual blower systems of the invention for providing, respectively, air and fuel flow to the assembly.
Figure 14B:
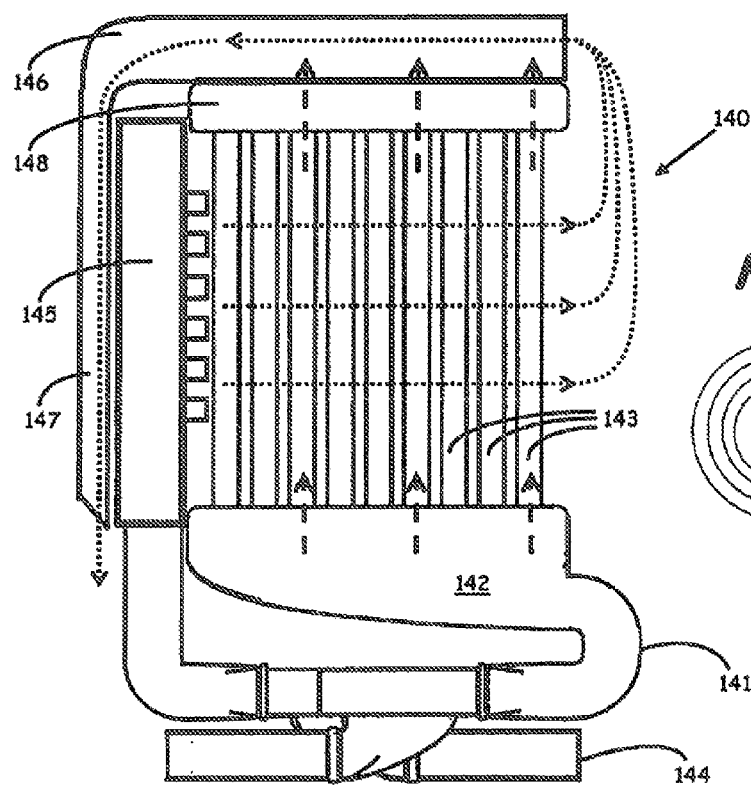
Figure 14C:
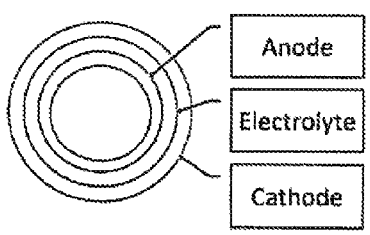
FIG. 14C is a diagrammatic illustration of a cross section of an individual tubular fuel cell in the tubular SOFC assembly of FIGS. 12A and 12B.
Figure 15A:
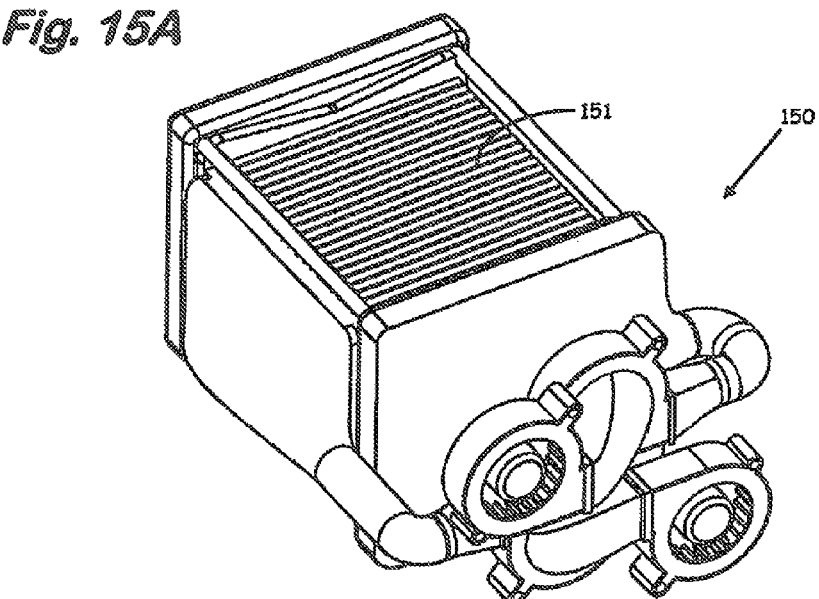
FIGS. 15A and 15B illustrate, respectively, perspective and plan views of a planar SOFC assembly possessing separate dual blower systems of the invention for providing, respectively, air and fuel flow to the assembly; and, FIG. 15C is a diagrammatic illustration of a cross section of an individual planar fuel cell in the planar SOFC assembly of FIGS. 13A and 13B.
Figure 15B:
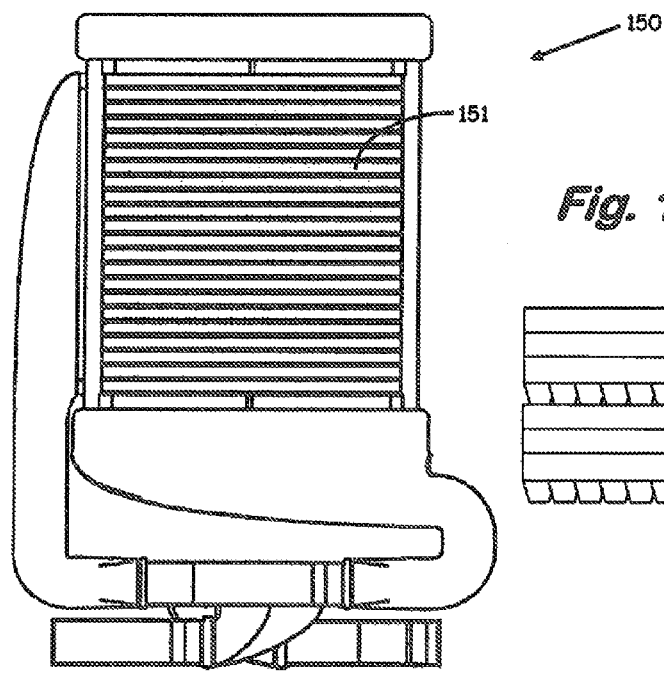

In tubular SOFC assembly, or stack, 140 of FIGS. 14A and 14B, first blower system 141 provides a gaseous fuel, e.g., hydrogen, to manifold 142 for distribution to the interior array 143 of tubular SOFC elements. Each tube in array 143 can be of known or conventional construction and, as shown in FIG. 14C, possesses an innermost fuel-contacting anode layer, intermediate electrolyte layer and outer cathode layer. Second blower system 144 distributes air, initially at ambient temperature, to manifold 145 from which it is released to provide a source of oxygen for the cathode component of each tubular SOFC element. The air entering manifold 145 grains heat from the hot combustion gases exiting tail burner 146 into heat exchanger 147. The dotted lines show the flow path of the heated air existing the outlets of manifold 145, passing through the SOFC array 143 and into tail burner 146 where it provides oxygen to support combustion of unspent fuel present in the exhaust gas emerging from the tubular SOFC elements into exhaust manifold 148 and from there into the tail burner. Finally, the hot combustion gases enter heat exchanger 147 where they serve to preheat incoming air provided by first blower system 141 as previously indicated.

Figure 15C:
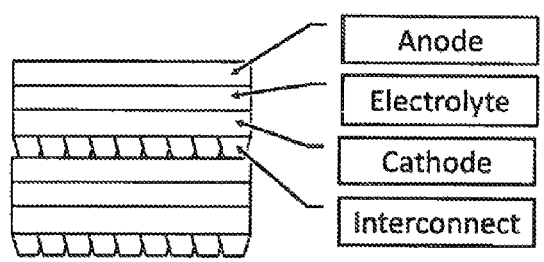

The construction and operation of the planar SOFC assembly shown in FIGS. 15A and 15B is much the same as that described above for the tubular SOFC assembly of FIGS. 14A and 14B the principal difference being the use of planar SOFC elements. As shown in FIG. 15C, each planar SOFC element in array 151 includes anode, electrolyte, cathode and interconnect components.

Although the invention has been described in detail for the purpose of illustration, it is understood that such detail is solely for that purpose, and variations can be made therein by those skilled in the art without departing from the spirit and scope of the invention which is defined in the claims.

What is claimed is:

1. A fuel cell system comprising:
   a fuel cell assembly comprising a plurality of individual fuel cells, each fuel cell having an electrolyte medium, a cathode and an anode; and,
   at least one centrifugal blower system for providing a flow of gaseous medium to the fuel cell assembly, the at least one centrifugal blower system comprising:
      a series of blower units, each blower unit in the series comprising a casing having an axial inlet and a radial outlet, an impeller disposed within the casing for drawing a gaseous medium at a first pressure in the axial inlet and expelling gaseous medium at a second higher pressure through the radial outlet, and a motor for driving the impeller; and,
      a duct connecting the radial outlet of at least one blower unit in the series of blower units with the axial inlet of at least one successive blower unit in the series of blower units.

2. The fuel cell system of claim 1 comprising at least two centrifugal blower systems, a first centrifugal blower system for providing a flow of gaseous medium to the anodes of the solid oxide fuel cell assembly and a second centrifugal blower system for providing a flow of gaseous medium comprising an oxidizer gas to the cathodes of the solid oxide fuel cell assembly.

3. The fuel cell system of claim 1 wherein the at least one centrifugal blower system further comprises:
   at least one gaseous medium-directing structure selected from the group consisting of interior walls of the duct configured to be substantially parallel to the trajectory of the gaseous medium expelled from the radial outlet of a blower unit to which the duct is connected, and a gas stream housing for receiving the gas stream from the radial outlet of the last blower unit in the series of blower units, the interior walls of the gas stream housing being configured to be substantially parallel to the trajectory of the gaseous medium expelled from the radial outlet of the last blower unit.

4. The fuel cell system of claim 1 wherein in the at least one centrifugal blower system, the orientation of the radial outlet of one blower unit in the series of blower units to the axial inlet of a successive blower unit in the series of blower units is approximately 0°, 90°, 180° or 270°.

5. The fuel cell system of claim 1 wherein in the at least one centrifugal blower system, the angle of pitch of the radial outlet of one blower unit in the series of blower units to the axial inlet of a successive blower unit in the series of blower units is approximately 0°, 30°, 60° or 90°.

6. The fuel cell system of claim 4 wherein in the at least one centrifugal blower system, the angle of pitch of the radial outlet of one blower unit in the series of blower units to the axial inlet of a successive blower unit in the series of blower units is approximately 0°, 30°, 60° or 90°.

7. The fuel cell system of claim 1 wherein in the at least one centrifugal blower system, at least one blower unit in the series of blower units has greater gas pressure and gas flow capability than another blower unit in the at least one centrifugal blower system.

8. The fuel cell system of claim 1 wherein in the at least one centrifugal blower system, at least one blower unit in the series of blower units is separated from at least one other blower in the at least one centrifugal blower system.

9. The fuel cell system of claim 1 wherein the at least one centrifugal blower system comprises a microprocessor configured to control independently the operation of the blower units in the series of blower units.

10. The fuel cell system of claim 3 wherein the interior walls of the gas stream housing are at an angle $\alpha$ of from 12° to 20° relative to the radial outlets of the blower units in the series of blower units.

11. The fuel cell system of claim 10 wherein the angle of pitch of the radial outlet of a blower unit in the series of blower units to the axial inlet of the successive blower unit in the series of blower units is approximately 0°.

12. The fuel cell system of claim 1 comprising at least two centrifugal blower systems, a first centrifugal blower system for providing a flow of gaseous medium to the anodes of the fuel cell assembly and a second centrifugal blower system for providing a flow of gaseous medium comprising air to the cathodes of the fuel cell assembly.

13. The fuel cell system of claim 1 wherein the at least one centrifugal blower system comprises a microprocessor configured to control the operation of the series of blower units.

14. The fuel cell system of claim 9 wherein the microprocessor is configured to control independently the operation of the blower units in the series of blower units such that operation of at least one blower unit in the series of blower units of the at least one centrifugal blower system provides from 50% to 90% of the flow of gaseous medium and the operation of at least one other blower unit in the series of blower units of the at least one centrifugal blower system provides the balance of the flow of gaseous medium.

15. The fuel cell system of claim 12 comprising a microprocessor configured to control independently each blower unit in the first centrifugal blower system and the second centrifugal blower system.

16. The fuel cell system of claim 15, wherein the microprocessor is configured to control independently the first centrifugal blower system such that at least one blower unit in the first centrifugal blower system provides from 50% to 90% of the flow of gaseous medium of the first centrifugal blower system and at least one other blower unit in the first centrifugal blower system provides the balance of the flow of gaseous medium of the first centrifugal blower system, and to control the operation of the second centrifugal blower system such that at least one blower unit in the second centrifugal blower system provides from 50% to 90% of the flow of gaseous medium comprising air of the second centrifugal blower system and at least one other blower unit in the second centrifugal blower system provides the balance of the flow of gaseous medium comprising air of the second centrifugal blower system.

* * * * *